UNITED STATES PATENT OFFICE.

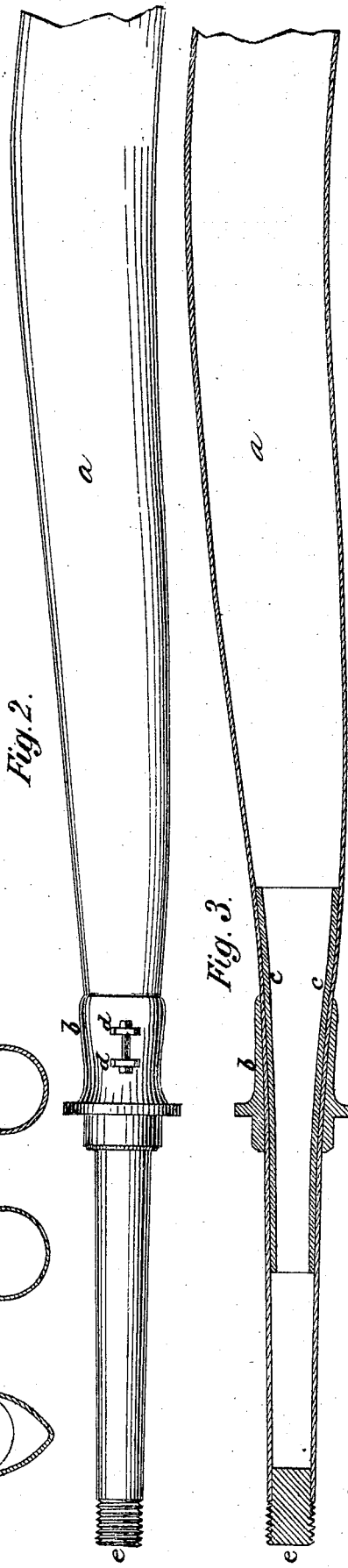
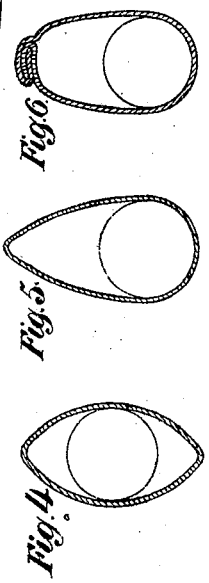
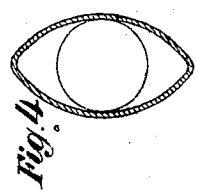
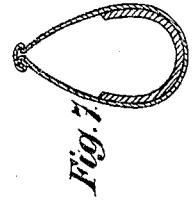

WILLIAM A. LEWIS, OF CHICAGO, ILLINOIS, ASSIGNOR TO HOLLOW-AXLE MANUFACTURING COMPANY, OF MISHAWAKA, INDIANA.

IMPROVEMENT IN HOLLOW AXLES FOR WAGONS AND CARRIAGES.

Specification forming part of Letters Patent No. 119,863, dated October 10, 1871; antedated September 29, 1871.

*To all whom it may concern:*

Be it known that I, WILLIAM A. LEWIS, of Chicago, in the county of Cook and State of Illinois, have invented a new and Improved Hollow Axle for Wagons, Carriages, &c.; and I do hereby declare that the following is a full and exact description thereof, reference being had to the accompanying drawing, which forms a portion of this specification.

My said improved hollow axle is primarily composed of a single sheet of metal, of such a shape that it can first be bent to substantially the form of an axle preparatory to its being afterward combined with the axle-screw plugs $e$, the interior stay-tubes $c$, and the thimbles $b$, substantially as shown in the drawing.

Figure 1 of the drawing represents the flat shape of a little more than one-half of the length of the aforementioned metallic sheet A. Fig. 2 is a side view of a little more than one-half of the length of one of my completely-finished hollow axles, and Fig. 3 is a longitudinal section of a little more than half the length of said finished axle.

In the manufacture of my said improved hollow axle I first prepare a mandrel of the desired form of said axle, and from said mandrel I obtain the shape of a pattern (shown by Fig. 1) to be employed in laying off the metallic sheet to be employed in the manufacture of my said hollow axle. Then, by a bending-and-hammering process, I shape the said metallic sheet upon the said mandrel; then I spring open the closed edges of said metallic sheet to a sufficient degree to remove therefrom the mandrel; then I place the tapering stay-tubes $c$ within the said partially-formed metallic sheet in the position shown in Fig. 3; then I place the screw-plugs $e$ in the journal ends of the said preliminary bent axle-tube; and then, after closing down the edges of said tubes into close contact with each other, I bring the same to a welding heat, and unite the said edges to each other by means of any suitable hammering or pressure process. After having thus united the edges of the metallic sheet $a$ into a continuous tube and, by the same process, firmly secured the screw-plugs $e$ within the journal ends of the same, I shrink the elongated thimbles $b$ upon the same in such positions that the outer ends of said thimbles form the journal-shoulders, while the elongated inner portions of said thimbles serve to stiffen and strengthen the axle, and also to carry the shaft-lugs $d\ d$, as shown in Fig. 2.

Figs. 4, 5, 6, and 7 are representations of different forms of cross-sections that may be adopted in the manufacture of my said improved hollow axle.

Instead of welding the edges of the metallic sheet $a$ to each other in the process of manufacturing my said hollow axle, I shall sometimes unite them by brazing and sometimes by locking them together, as represented by Figs. 6 and 7; but the edges of the journal portions of said axle must in all cases be butt-welded or brazed to each other.

When metallic sheets of a considerable degree of thickness are employed in the manufacture of my improved hollow axles I shall dispense with the use of the interior stay-tubes $c$; and in such case I shall also dispense with the axle-screw plugs $e$ and cut the screw-threads directly upon the periphery of the ends of the journal portions of the axle.

I claim as my invention, and desire to secure by Letters Patent, as a new manufacture—

An improved hollow axle for wagons, carriages, &c., composed of a properly-shaped metallic sheet, $a$, combined with the thimbles $b$ and with suitable journal-screws or screw-plugs $e$, substantially as herein set forth.

WM. A. LEWIS.

Witnesses:
Z. C. ROBBINS,
W. MORRIS SMITH.          (31)